Figure 1:
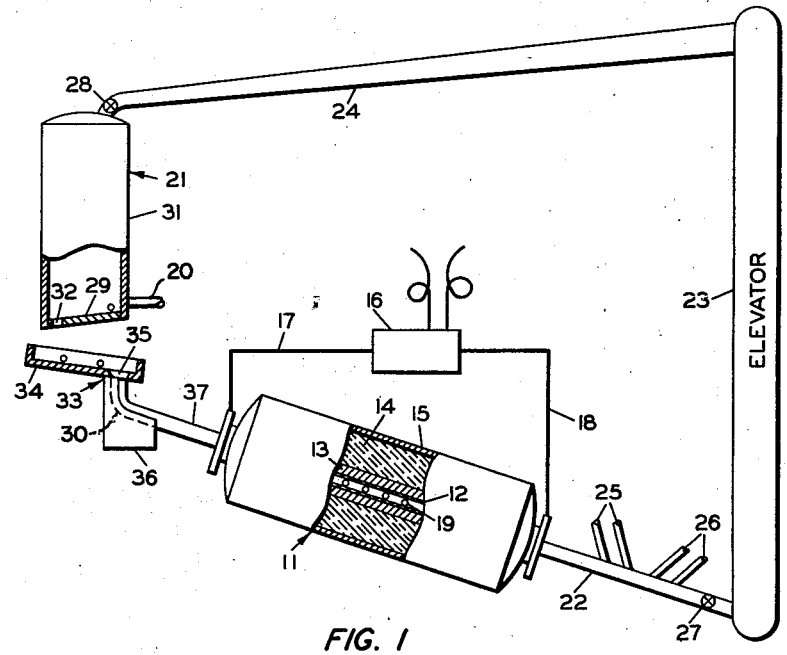

July 7, 1953  S. P. ROBINSON ET AL  2,644,328
PEBBLE TESTING METHOD AND APPARATUS
Filed Dec. 13, 1948  2 Sheets-Sheet 1

INVENTORS
S. P. ROBINSON
R. R. GOINS
BY Hudson and Young
ATTORNEYS

July 7, 1953  S. P. ROBINSON ET AL  2,644,328
PEBBLE TESTING METHOD AND APPARATUS
Filed Dec. 13, 1948  2 Sheets-Sheet 2

INVENTORS
S. P. ROBINSON
R. R. GOINS
BY
ATTORNEYS

Patented July 7, 1953

2,644,328

UNITED STATES PATENT OFFICE 2,644,328

PEBBLE TESTING METHOD AND APPARATUS

Sam P. Robinson and Robert R. Goins, Bartlesville, Okla., assignors to Phillips Petroleum Company, a corporation of Delaware Application December 13, 1948, Serial No. 64,936

11 Claims. (Cl. 73—15.4)

This invention relates to a pebble tester. In one of its more specific aspects it relates to a method and apparatus for testing the physical strength of heat transfer pebbles.

One of the problems involved in the successful operation of heat exchangers utilizing solid flowable materials as their heat exchange medium is the procurement or development of solid heat exchange material which is capable of withstanding extremely high or extremely low temperatures, as the case may be, depending upon the system in which the solid heat exchange material is utilized. Such solid heat exchange material is ordinarily called "pebbles." Pebbles utilized in such systems may be of any flowable shape or size. Ordinarily, however, pebbles ranging between about one-sixteenth and one inch in diameter and being substantially spherical in shape produce the best flow patterns and the best heat exchange. It is highly desirable that the pebbles developed for pebble heat exchangers be as resistant to thermal and mechanical shock as possible. For the most economic development of such pebbles, it is necessary to place sample pebbles under certain thermal and mechanical stresses as rapidly as possible during the testing period. Testing of pebbles in fixed bed operation has proved to be neither suitable nor practical.

An object of this invention is to provide a means for determining the strength of heat transfer pebbles. Another object of this invention is to provide a means for subjecting heat transfer pebbles to thermal shock. Another object of this invention is to provide an improved method for subjecting heat transfer pebbles to thermal shock. Another object of this invention is to provide means for subjecting heat transfer pebbles to mechanical shock. Another object of this invention is to provide an improved method for subjecting heat transfer pebbles to mechanical shock. Another object of this invention is to provide a means and method for testing the strength of pebbles for pebble heating systems. Another object of the invention is to provide a means and method for testing the strength of pebbles for pebble cooling systems. Other and further objects and advantages will be apparent upon study of the accompanying disclosure.

We have invented a device by which pebbles which are to be tested may be subjected to very great thermal and mechanical shock at a very rapid rate. By the utilization of this device we are able to rapidly determine the relative ability of any given pebbles to withstand severe thermal and mehcanical shock.

Figure 2:
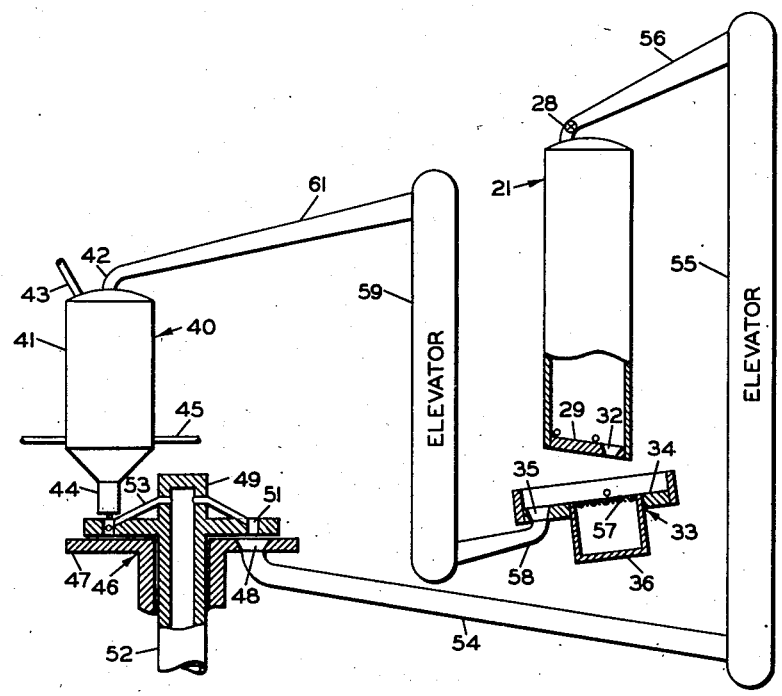
Figure 3:
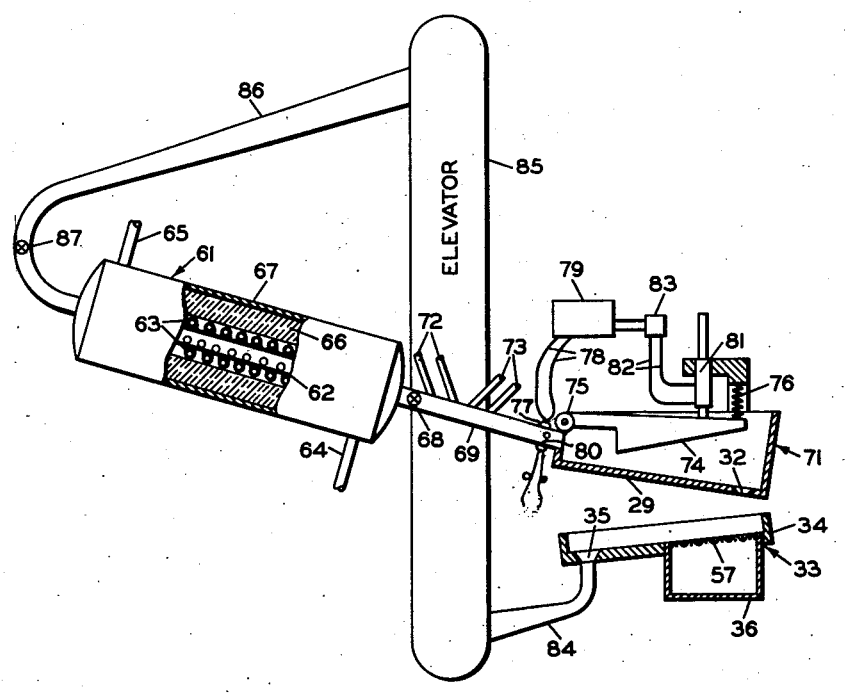

More complete understanding of our invention will be obtained upon study of the accompanying diagrammatic drawings. Figure 1 of the drawing is a vertical elevation, partially in section, of the preferred form of our device. Figure 2 is an elevation, partially in section, of a modified form of the invention. Figure 3 is an elevation, partially in section, of a second modification of our invention.

In the device schematically shown as Figure 1 of the drawing, heater 11 comprises a heat resistant conduit tube 12 which is encased within an electrical resistance element 13 which is in turn encased by insulation material 14 and heater chamber 15. The ends of resistance element 13 are connected with electrical transformer 16 by electrical lead lines 17 and 18. Heater 11 is inclined from the horizontal by such an angle as will cause pebbles 19 to flow freely through conduit 12. An inclination of approximately 10° from the horizontal has proved to give the best flow of pebbles through the heater, although greater or lesser degrees of inclination will provide fairly good pebble flow. A first conveyor means connects the lower end of heater 11 with the upper end of pebble compression applicator 21. The first conveyor means comprises a conduit 22, extending from the lower end of heater 11 to the lower portion of elevator 23, elevator 23, and conduit 24 which extends from the upper portion of elevator 23 to the upper portion of pebble compression applicator 21. Cooling gas inlet conduits 25 communicate between a cooling fluid supply source (not shown) and the first conveyor means, preferably pebble conduit 22. Any number of cooling conduits which is necessary to provide the amount of cooling fluid necessary for sudden cooling may be utilized. Effluent outlet conduits 26 are provided in the first conveyor means, preferably downstream of the cooling conduits 25 in pebble conduit 22. A pebble feeder 27 may be provided in conduit 22 so as to control the rate of flow of pebbles through heater 11 and conduit 22. Pebble compression applicator 21 comprises a pebble feeder 28 in its upper end and a hard surfaced pebble receiver member 29 disposed at least three and one-half feet vertically below feeder member 28. Receiver member 29 is preferably spaced from feeder member 28 by a vertical distance of at least six feet. Receiver member 29 is preferably inclined from the horizontal so as to allow gravity to substantially clear the surface of receiver member 29 and to move pebbles and fragments thereof to the lower end of member 29. A chamber 31 preferably extends between pebble feeder 28 and receiver member 29. Pebble outlet opening 32 is provided in the lower end of receiver member 29. Pebble sorting means 33 comprises plate 34 which is disposed vertically below pebble outlet opening 32 of pebble compression applicator 21. The surface of plate 33 is inclined toward outlet opening 35 therein. Extractor member 36 also forms a part of sorting means 33 and is disposed intermediate plate 34 and the upper end of heating chamber 11. Extractor 36 is preferably a chamber disposed below a second conveyor means comprising pebble conduit 37 extending between opening 35 and the upper end of heater 11. Conduit 37 is provided with a false bottom 38 within extractor 36 so as to allow broken particles to fall therethrough.

In the operation of the device shown as Figure 1 of the drawings, pebbles 19 are passed into the upper end of heater 11, which is inclined a few degrees from the horizontal, and are raised to a relatively high temperature therein ranging between about 1600° F. and about 3500° F. at a rate of between about 1000° F. and 1800° F. per minute. The heated pebbles flow through heater 11 and into pebble conduit 22 in which they are subjected to the cooling action of an inert fluid, preferably a gas, so as to cool the pebbles at a rate of between about 2000° F. and 3500° F. per minute. Use of air jets for cooling obtains a much more rapid rate of cooling of the pebbles than is obtained by dropping the pebbles into water or other liquid. When water is used, steam effectively insulates the surface of the pebble and prevents efficient cooling. Effluent outlet conduits 26 are sufficiently large to provide the path of least resistance for the cooling gases out of conduit 22. The cooled pebbles are fed to elevator 23 by pebble feeder 27 and are carried to the upper portion of elevator 23 and are there passed into the upper portion of conduit 24. Conduit 24 is inclined so as to allow the pebbles to flow downwardly therethrough by gravity. The lower end portion of conduit 24 may act as a pebble collector from which the pebbles are fed by pebble feeder 28, positioned in a constricted portion thereof, and are passed into pebble compression applicator 21 wherein they are dropped a predetermined vertical distance onto the hard surfaced receiver member 29, the weight of the pebble furnishing the compression for the pebble. Unfractured pebbles flow downwardly over the surface of member 29 through outlet opening 32 and onto the surface of plate 34 of pebble sorting means 33. Fractured particles of pebbles may roll off of the surface of member 29 or be removed from within chamber 31 by applying a jet of air or some similar flushing gas to the surface of plate 29 through conduit 28 so as to sweep the fractured particles downwardly over member 29 and through outlet opening 32. Fractured particles may be removed from the system at the surface of plate 34 or passed with the pebbles downwardly through opening 35 in plate 34 into conduit 37. The pebbles flow through conduit 37 into the upper end of heater 11 to repeat the test cycle. Fractured particles of pebbles fall through the false bottom of conduit 37 into extractor 36 from which they are removed. The electrical current which is passed through electrical resistance element 13 may be varied at transformer 16 so as to provide the desired temperature within heater 11. One modification which may be applied to the device of Figure 1 is that a false bottom may be provided in sorting plate 34, as shown in Figure 3, so as to allow broken particles to fall directly from outlet opening 32 into an extractor while conveying the unbroken pebbles into the upper portion of heater 11. In the inclined arrangement of heater and conduits, the relation between pebble size and conduit size is critical only in that the conduit must be of such diameter as to allow the pebbles to flow therethrough. The conduits are preferably sized so as to be but slightly larger than the largest pebble in the system. Jamming of pebbles is thus substantially eliminated.

The device shown as Figure 2 of the drawings comprises a substantially vertically disposed heater 40 having a closed shell 41 and being provided in its upper end with pebble inlet conduit 42 and effluent outlet conduit 43. Pebble outlet conduit 44 which is slightly larger than the diameter of the pebbles is provided in the lower portion of heater 40 and heating fluid conduits 45 are also provided in the lower portion of heater 40. Heater 40 may be provided with a separate combustion chamber within the lower portion of chamber 40 or adjacent the periphery of heater 40 in its lower end portion. It is believed, however, that the most efficient heating is obtained by the injection of fuel directly into heater 40 and by burning such fuel on the surface of pebbles passing downwardly through heater 40. Pebble feeder 46 is provided below the outlet end of pebble outlet conduit 44. Feeder 46 is in the form of a flat plate 47 having an outlet opening 48 in its side diametrically spaced from pebble outlet conduit 44. Rotation member 49 is provided with openings 51 which are slightly larger than the diameter of the pebbles and are disposed on a circle directly below pebble outlet conduit 44. Rotation member 49 is mounted on a hollow shaft 52 through which cooling fluid, preferably a gas, is passed. Outlets 53 communicate between hollow shaft 52 and openings 51 of rotation member 49. A cooling fluid conduit may also be directed against the lower surface of plate 47 to lower its temperature and reduce erosion thereof. A first conveyor means comprises conduit 54 which communicates between opening 48 in plate 47 and the lower portion of elevator 55, also a part of the first conveyor means. Conduit 56, also a part of the first conveyor means, communicates between the upper portion of elevator 55 and the top of pebble compression applicator 21. Pebble feeder 28 is provided in the upper end of compression applicator 21 at the lower end of conduit 56. Compression applicator 21 is provided in its lower end with a hard surfaced receiver member 29 which is disposed at an angle with the horizontal as discussed above in connection with the device of Figure 1. Outlet opening 32 is provided at the lower end of receiver member 29. Sorting means 33 is disposed vertically below opening 32 and is provided with a grill or false bottom 57 directly below opening 32. Extractor 36 is provided below false bottom 57. Plate 34 is disposed at an angle from the horizontal and is provided in its lower end with pebble outlet opening 35. A second communication means communicates between pebble sorting means 33 and the upper portion of heater 40 and comprises conduit 58 which communicates between opening 35 of plate 34 and the lower portion of elevator 59. Conduit 61, also a portion of the second conveyor means, communicates between the upper portion of elevator 59 and the upper portion of heater 40.

The device shown in Figure 2 of the drawings operates very similarly to that shown in Figure 1 of the drawings. Pebbles are injected into the upper portion of heater 40 and pass downwardly therethrough countercurrent the flow of hot combustion gas therethrough. A portion of the heating is preferably obtained by burning the fuel on the surface of the pebbles. Heated pebbles pass downwardly through pebble outlet conduit 44 and are received by openings 51 as rotation means 49 causes openings 51 to enter the same vertical plane as that in which pebble outlet conduit 44 is maintained. Cooling gas is directed through hollow shaft 52 and outlets 53 against pebbles in openings 51, thus cooling the pebbles during their travel from a point below pebble outlet 44 to outlet opening 48 in plate 47. The pebbles flow by gravity through conduit 54 and are elevated by elevator 55 to the upper portion of conduit 56 and are transported through conduit 56 to pebble feeder 28 which passes them into compression applicator 21, allowing them to fall upon receiver member 29. The pebbles then pass downwardly through opening 32, over the surface of plate 34, through opening 35, and are transported to the upper portion of heater 40 by means of conduit 58, elevator 59 and conduit 61. Broken particles may be removed from compression applicator 21 by gravity which causes them to roll off the surface of member 29 or by injecting a flushing gas along the surface of member 29 so as to blow the particles through outlet opening 32, thus allowing the particles to fall through the false bottom of plate 34 into extractor 36.

The modifications of our invention which have been described heretofore have been devoted to apparatus used in testing pebbles for pebble heating apparatus. We are aware of the fact that heat exchange pebbles are also used in pebble cooler systems and the modification shown in Figure 3 of the drawing is used for the testing of the pebbles to be used in such cooling systems.

Cooler 61 comprises a conduit member 62 extending centrally through cooler 61. Conduit member 62 is surrounded by a cooling coil 63 having an inlet 64, preferably at the downstream end of cooler 61, and an outlet 65 at the upstream end of cooler 61. Cooling coil 63 is enclosed within insulation 66 and chamber 67. A pebble feeder 68 is provided in pebble conduit 69 which communicates between the lower end of cooler 61 which is disposed at an angle from the horizontal and compression applicator 71. Heating fluid inlet conduits 72 communicate between a heating fluid supply source (not shown) and pebble conduit 69 at a point downstream of pebble feeder 68. Effluent outlet conduits 73 are also provided in pebble conduit 69. Pebble compression applicator 71 comprises a hard surfaced receiver member 29 which is disposed at an angle from the horizontal, preferably tilted away from the outlet end of conduit 69. Outlet opening 32 is provided in the lower end of member 29. Compressor 74 is disposed above member 29 and is hinged at one end by hinge 75. Compressor 74 is supported at its other end by spring member 76. A photoelectric cell 77, positioned in the beam of a light source 80, is provided in the lower end of conduit 69 and communicates by electrical leads 78 with amplifier 79. Amplifier 79 communicates with a solenoid 81 by leads 82 and a time delay circuit 83 is provided intermediate the ends of leads 82. Sorting means 33 is disposed vertically below outlet opening 32 in member 29. False bottom 57 is provided in plate 34 directly below opening 32 so as to allow particles to fall therethrough into extractor member 36. Pebble sorting means 33 is disposed at an angle from the horizontal and outlet opening 35 is provided in its lower end portion. The second conveyor means communicates between opening 35 and the upper end of cooler 61. The second conveyor means comprises conduit 84 which communicates between opening 35 and the lower portion of elevator 85. Conduit 86, also a part of the second conveyor means, communicates between the upper portion of elevator 85 and the upper end of cooler 61. Pebble feeder 87 may be provided in conduit 86 intermediate its ends.

In the operation of the device shown in Figure 3 of the drawing, pebbles are inserted into the upper end of cooler 61 and flow downwardly therethrough. Cooling fluid is inserted into cooler 61 through inlet 64 at any desirable temperature. In order to obtain best results, a cooling fluid at a temperature ranging between about −150° F. and −300° F. is preferred. The cooled pebbles are fed from the lower portion of cooler 61 by feeder 68 and are brought in direct heat exchange with hot heating fluid from conduit 72. Pebble feeder 68 may be provided in the lower portion of conduit 69 so as to control the velocity of pebble flow therethrough. The pebbles are raised to a temperature between about 500° F. and 900° F. by the heating fluid. The heating fluid is removed through heating effluent outlets 73 and the pebbles pass downwardly through conduit 69 and break the light beam directed onto photoelectric cell 77 from light supply source 80 in the lower end portion of conduit 69. Amplifier 79 is energized by the break in the light beam and passes a current through time delay circuit 83 to solenoid 81 which forces compressor 74 downwardly in time to contact the pebble on the surface of receiver member 29 and compress the pebble therebetween. The pebbles and broken particles are removed from member 29 through outlet opening 32 and pass onto plate 34. Broken particles fall through false bottom 57 in plate 34 into extractor 36. Unbroken pebbles pass downwardly over the surface of plate 34 and are removed through outlet opening 35. The pebbles are transported by means of conduit 84, elevator 85, and conduit 86, to the upper end of cooler 61 where they are once again subjected to the test cycle.

The pebble compressor applicator which is shown in Figure 3 of the drawings may be substituted for that shown in the devices set forth in Figures 1 and 2 of the drawings. The method disclosed for actuating compressor 74 is merely exemplary. Other means and methods may be utilized for compressing pebbles without departing from the scope of the disclosure.

The heaters of Figure 1 and Figure 2 may be interchangeable. The outlet of the vertical heater should, however, be but slightly larger in diameter than the diameter of the pebbles tested. That limitation is not placed on the inclined heaters. Another modification which may be applied to our invention is most easily described in connection with the device shown in Figure 3 of the drawings. The gas which is injected into conduit 69 may be regulated so as to give a desired pressure. A heater may be substituted for cooler 61 in those cases in which it is desired to test pebble heater pebbles, and the gas injected through conduit 72 may in that case be a cooling fluid. The compressor may be removed, conduits 73 may be closed, and the downstream end wall of receiver member 29 opposite the outlet end of pebble conduit 69 used as receiver member 29. As pebbles are fed from the end of the heater or cooler, the cooling or heating gas fed through conduit 72 may be injected at such a velocity as to carry the pebbles at a rapid rate out of conduit 69 and against the downstream wall of member 29 so as to provide the desired compression for the pebbles.

The pebble feeder members disclosed above may be conventional star valves or a rotating grooved wheel maintained against the surface of the pebbles by a tension member. Pebble receiver member 29 may be adjustably mounted in the lower end of compression applicator 21 so as to allow the adjustment of compression for the pebbles in the compression applicator. The greater the thermal and mechanical shock which can be applied in one circuit of the test system the more economical the testing becomes. Other and further modifications will be obvious to those skilled in the art upon study of the disclosure and such modifications may be made without deviating from the spirit and scope of this disclosure.

We claim:

1. A pebble strength testing device which comprises in combination a first heat exchanger; a pebble compression applicator; a first conveyor means communicating between said first heat exchanger and said compression applicator; a second heat exchanger intermediate the ends of said first conveyor means; a second conveyor means communicating with the upper portion of said first heat exchanger; and pebble sorting means communicating between said compression applicator and said second conveyor means.

2. The pebble strength testing device of claim 1, wherein said compression applicator comprises a pebble feeder in its upper end, and a hard surfaced receiver member disposed at least three and one half feet vertically below said pebble feeder.

3. The pebble strength testing device of claim 1, wherein said compression applicator comprises a pebble collector having a constricted opening in its lower end, and a hard surfaced member disposed at least six feet vertically below said opening in said pebble collector.

4. The pebble strength testing device of claim 1, wherein said compression applicator comprises a hard surfaced member, and a compressor operatively connected to said hard surfaced member.

5. A pebble strength testing device which comprises in combination a heater; a pebble compression applicator; a first conveyor means communicating between said heater and said compression applicator; at least one coolant conduit communicating between a coolant supply source and said first conveyor means; a second conveyor means communicating with the upper portion of said heater; and pebble sorting means communicating between said compression applicator and said second conveyor means.

6. The pebble strength testing device of claim 1, wherein a pebble feeder is provided intermediate the ends of said first conveyor means.

7. A pebble strength testing device which comprises in combination an inclined heater; an elevator; a first pebble conduit communicating between the lower portion of said heater and the lower portion of said elevator; a pebble feeder intermediate the ends of said pebble conduit; at least one coolant conduit communicating between a coolant supply source and said pebble conduit; a pebble compression applicator; a second pebble conduit extending between the upper portion of said elevator and the upper portion of said compression applicator; pebble sorting means communicating with the lower portion of said compression applicator; and a third pebble conduit communicating between said pebble sorting means and the upper portion of said heater.

8. The pebble strength testing device of claim 7, wherein said compression applicator comprises a pebble feeder having a constricted opening in its lower end; and a hard surfaced member disposed at least three and one-half feet vertically below said opening in said pebble feeder.

9. A pebble strength testing device which comprises in combination a cooling chamber; a pebble compression applicator; a first conveyor means communicating between said cooling chamber and said compression applicator; at least one heating fluid conduit communicating between a heating fluid supply source and said first conveyor means; a second conveyor means communicating with the upper portion of said cooling chamber; and pebble sorting means communicating between said compression applicator and said second conveyor means.

10. A method of testing the strength of heat transfer pebbles which comprises introducing said pebbles into a first heat exchange zone; raising the temperature of said pebbles to a temperature within the range of between 1600° F. and 3500° F. at a rate of between 1000° F. and 1800° F. per minute; passing said heated pebbles at their elevated temperature to a second heat exchange zone; cooling said pebbles within said second heat exchange zone at a rate of between 2000° F. and 3500° F. per minute; conveying said cooled pebbles to a compressor zone; subjecting said cooled pebbles to a sudden predetermined compression within said compressor zone; separating unbroken pebbles from broken pebbles; and recycling said unbroken pebbles to said first heat exchange zone.

11. The method of claim 10, wherein said pebbles are subjected to a predetermined compression by dropping said pebbles onto a hard surface within said compressor zone from a predetermined height.

SAM P. ROBINSON.
ROBERT R. GOINS.

References Cited in the file of this patent

UNITED STATES PATENTS

| Number | Name | Date |
|---|---|---|
| 970,373 | Hemstreet | Sept. 13, 1910 |
| 1,498,659 | Jackson | June 24, 1924 |
| 2,264,412 | Shindel | Dec. 2, 1941 |

FOREIGN PATENTS

| Number | Country | Date |
|---|---|---|
| 227,139 | Great Britain | Jan. 12, 1925 |